(12) United States Patent
Bloink et al.

(10) Patent No.: US 9,446,646 B1
(45) Date of Patent: Sep. 20, 2016

(54) SPRING SEATS AND VEHICLE SUSPENSION SYSTEMS INCORPORATING SUCH SPRING SEATS

(71) Applicant: Hendrickson USA, L.L.C., Itasca, IL (US)

(72) Inventors: Michael P. Bloink, Romeoville, IL (US); Damon E. Dilworth, Channahon, IL (US); Paul D. Elwood, Plainfield, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 14/725,522

(22) Filed: May 29, 2015

(51) Int. Cl.
*B60G 11/113* (2006.01)
*B60G 11/04* (2006.01)

(52) U.S. Cl.
CPC ............. *B60G 11/113* (2013.01); *B60G 11/04* (2013.01)

(58) Field of Classification Search
CPC .............................. B60G 11/113; B60G 11/04
See application file for complete search history.

(56) References Cited

U.S. PATENT DOCUMENTS

| | | | |
|---|---|---|---|
| 5,921,570 A | 7/1999 | Lie | |
| 5,938,221 A | 8/1999 | Wilson | |
| 5,950,971 A | 9/1999 | Koumbis et al. | |
| 6,082,750 A * | 7/2000 | Merkler | B60G 9/00 267/260 |
| 6,206,407 B1 * | 3/2001 | Fuchs | B60G 5/00 280/124.174 |
| 6,264,231 B1 * | 7/2001 | Scully | B60G 5/047 248/228.1 |
| 6,390,485 B1 | 5/2002 | Cadden | |
| 6,406,007 B1 | 6/2002 | Wilson | |
| 7,744,105 B2 | 6/2010 | Dudding et al. | |
| 8,177,246 B2 | 5/2012 | Cortez | |
| 8,544,961 B2 | 10/2013 | Bubulka et al. | |
| 2004/0041463 A1 | 3/2004 | Gabella et al. | |
| 2004/0155424 A1 | 8/2004 | Hicks et al. | |
| 2006/0244236 A1 * | 11/2006 | Cortez | B60G 11/113 280/124.175 |
| 2010/0038877 A1 * | 2/2010 | Cortez | B60G 11/113 280/124.175 |
| 2010/0044991 A1 * | 2/2010 | Luna | B60G 9/003 280/124.175 |
| 2011/0221105 A1 * | 9/2011 | Henksmeier | B60G 9/003 267/52 |
| 2014/0117639 A1 | 5/2014 | Ramsey et al. | |
| 2015/0014953 A1 | 1/2015 | Pierce et al. | |
| 2015/0165851 A1 * | 6/2015 | Dilworth | B60G 11/04 280/124.175 |
| 2015/0210135 A1 * | 7/2015 | Mater, Jr. | B60G 11/113 248/201 |

FOREIGN PATENT DOCUMENTS

WO  WO 2006/116513 A2  11/2006

OTHER PUBLICATIONS

Notification of Transmittal of the International Search Report and the Written Opinion of the International Searching Authority for PCT/US2016/021668, dated Jun. 2, 2016.

* cited by examiner

*Primary Examiner* — Drew Brown
(74) *Attorney, Agent, or Firm* — Cook Alex Ltd.

(57) ABSTRACT

A spring seat is provided for incorporation into a vehicle suspension system having an axle and a leaf spring. The spring seat includes a seat portion and a spring mounting portion associated with an upper end of the seat portion. The spring mounting portion is configured to accommodate a portion of the leaf spring and includes an upper surface. The upper surface defines a plurality of bores, with at least one of the bores being internally threaded and receiving at least a portion of an externally threaded mechanical fastener. Alternatively (or additionally), the axle may include a body, with at least one of the bores of the spring mounting portion of the spring seat being at least partially positioned directly above the body of the axle.

20 Claims, 3 Drawing Sheets

SPRING SEATS AND VEHICLE SUSPENSION SYSTEMS INCORPORATING SUCH SPRING SEATS

BACKGROUND

1. Field of the Disclosure

The present subject matter relates to vehicle suspension systems and components thereof. More particularly, the present subject matter relates to spring seats of leaf spring suspensions.

2. Description of Related Art

Leaf springs are commonly used as active components in vehicle suspensions. Examples of suspensions using a leaf spring are shown and described in U.S. Pat. Nos. 5,938,221; 7,744,105; and 8,177,246, the disclosures of which are hereby incorporated herein by reference.

One possible shortcoming of known leaf spring suspensions is the weight of the components of the system required to secure the leaf spring with respect to an axle of the vehicle. Typically, the suspension includes a spring seat that is secured directly to the axle, with the leaf spring sandwiched between the spring seat and a top cap. The top cap is secured to the spring seat by a plurality of bolts (in some cases, U-bolts), which must be positioned fore and aft of the axle to prevent interference between the bolts and the axle. This arrangement increases the size of the spring seat and top cap, which increases the total weight of the spring seat and top cap.

Additionally, this arrangement increases the percentage of the leaf spring that is clamped in place between the spring seat and the top cap. The clamped portion of the leaf spring either cannot bend or cannot bend as freely as the unclamped portions of the leaf spring, which renders the leaf spring less effective at performing its intended function. This may require the length of the leaf spring to be increased to reduce the spring rate of the leaf spring to a suitable level, but doing so may be undesirable (due to increased weight and material costs), if not impossible due to the packaging constraints of the vehicle.

Accordingly, it is desirable to overcome one or more of the foregoing shortcomings, or alternatively other shortcomings not specified herein but associated with prior leaf spring suspensions.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately as set forth in the claims appended hereto.

In one aspect, a spring seat is provided for a vehicle suspension system having an axle and a leaf spring. The spring seat includes a seat portion and a spring mounting portion. The seat portion is configured to be connected to an axle and includes an upper end. The upper end of the seat portion is associated with the spring mounting portion, which is configured to accommodate a portion of a leaf spring. The spring mounting portion includes an upper surface, which defines a plurality of bores. At least one of the bores is internally threaded and configured to receive at least a portion of an externally threaded mechanical fastener.

In another aspect, a vehicle suspension system comprises an axle, a leaf spring, a top cap, a spring seat, and a plurality of mechanical fasteners. The spring seat includes a seat portion connected to the axle, with an upper end of the seat portion being associated with a spring mounting portion of the spring seat. The spring mounting portion has an upper surface defining a plurality of bores, with at least one of the bores being internally threaded. Each bore receives at least a portion of a different one of the mechanical fasteners, with any mechanical fastener received by an internally threaded bore being externally threaded. The mechanical fasteners connect the top cap to the spring seat, with a portion of the leaf spring being positioned between the top cap and the spring seat.

In yet another aspect, a vehicle suspension system comprises an axle having a body, a leaf spring, a top cap, a spring seat, and a plurality of mechanical fasteners. The spring seat includes a seat portion connected to the axle, with an upper end of the seat portion being associated with a spring mounting portion of the spring seat. The spring mounting portion has an upper surface defining a plurality of bores, each of which receives at least a portion of a different one of the mechanical fasteners. The mechanical fasteners connect the top cap to the spring seat, with a portion of the leaf spring being positioned between the top cap and the spring seat. At least a portion of one of the bores is positioned directly above the body of the axle.

DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

Figure 1:
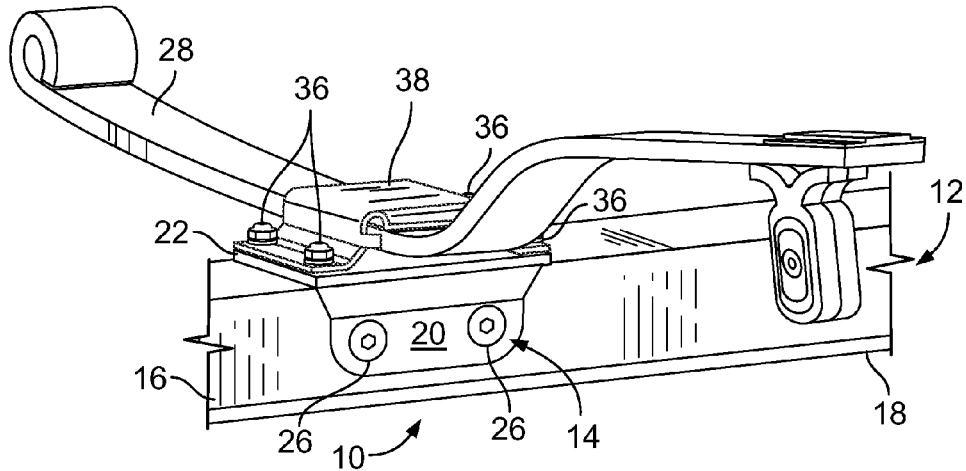
FIG. 1 is a front perspective view of a vehicle suspension system according to an aspect of the present disclosure.

FIG. 1 illustrates selected of the components of a vehicle suspension system 10 present on one side of a vehicle. It should be understood that the opposite side of the vehicle may include duplicate suspension components or differently configured suspension components.

Figure 2:
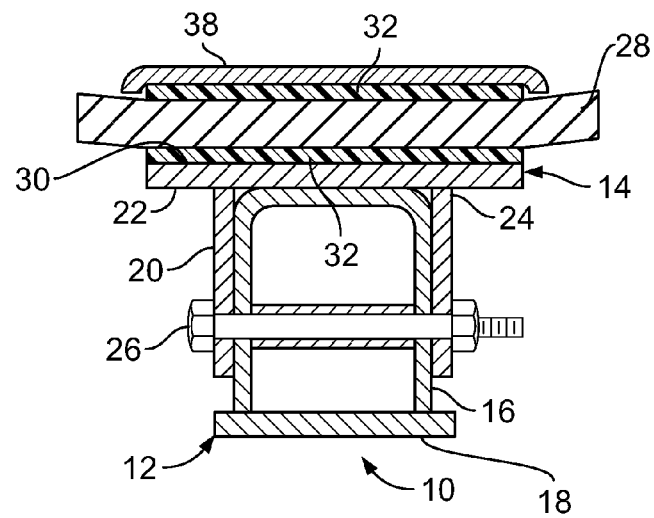
FIG. 2 is a cross-sectional view of a portion of the vehicle suspension system of FIG. 1.

FIG. 1 shows a vehicle axle 12 with a spring seat 14 of the vehicle suspension system 10 connected to the top surface of the axle 12. In particular, the axle 12 is illustrated as having a fabricated construction, with a body 16 having an inverted U- or C-shape that is secured to a bottom plate 18, as shown in FIG. 2. The bottom plate 18 may be wider than the body 16 (i.e., have a greater dimension in the fore-aft direction, which is the left-right direction in the orientation of FIG. 2) to allow for a weld to be placed along at least a portion of the length of the bottom plate 18 to secure it to the body 16. In a preferred embodiment, the axle 12 is manufactured and configured as described in U.S. Pat. No. 8,544,961, the disclosure of which is hereby incorporated herein by reference, but it is within the scope of the present disclosure for the axle 12 to be differently configured (including being either fabricated or non-fabricated).

Figure 3:
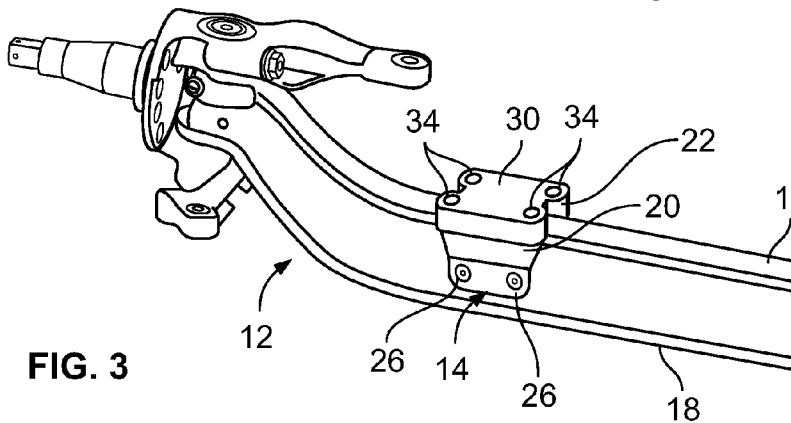
FIG. 3 is a front perspective view of an axle and spring seat of the vehicle suspension system of FIG. 1.

The spring seat 14 includes a seat portion 20, which is configured to be connected to the axle 12 (preferably to the axle body 16), and a spring mounting portion 22, which is associated with an upper end 24 of the seat portion 20 (FIG. 2). FIG. 3 shows the spring seat 14 connected to the axle 12 with other components of the vehicle suspension system 10 omitted. The seat portion 20 may be secured to the axle 12 in any suitable fashion (e.g., by welding), but is shown in the illustrated embodiment as being secured to the axle 12 by a pair of longitudinally oriented mechanical fasteners 26 (e.g., bolts). The spring mounting portion 22 may be secured to the upper end 24 of the seat portion 20 in any suitable manner, which may include welding, or may be integrally formed with the seat portion 20, thereby providing the spring seat 14 with a one-piece construction.

The design of the illustrated spring seat 14 is relatively simple, but it should be understood that the spring seat 14 may be differently configured without departing from the scope of the present disclosure. For example, the profile of the spring mounting portion 22 (when viewed from above) may be generally square or rectangular (as in FIGS. 4-7) or have selected portions omitted (illustrated in FIG. 3 as generally semi-circular cutouts along the inboard and outboard edges of the spring mounting portion 22) to reduce the weight of the spring seat 14 without unduly decreasing its strength. The spring seat 14 may also include additional components or features without departing from the scope of the present disclosure, such as inboard and outboard sidewalls connected to the seat portion 20 and to the spring mounting portion 22 to increase the strength and stiffness of the spring seat 14.

The vehicle suspension system 10 also includes a leaf spring 28, which sits upon an upper surface 30 of the spring mounting portion 22 of the spring seat 14. The upper surface 30 is configured to accommodate a portion of the leaf spring 28, either being contoured to seat a clamped portion of the leaf spring 28 or (as in the illustrated embodiment) substantially planar, but sufficiently sized to seat the clamped portion of the leaf spring 28. As shown in FIG. 2, the clamped portion of the leaf spring 28 may be encapsulated in an elastomeric or deformable liner 32 to prevent metal-to-metal connection between the leaf spring 28 and the components of the clamp group. In another embodiment, a separate elastomeric or deformable liner or liners may be provided between the leaf spring 28 and the components of the clamp group to prevent metal-to-metal connection. It may be preferred to provide a liner 32, which allows the clamped portion of the leaf spring 28 to bend to a greater extent than possible with a metal-to-metal connection, but it is also within the scope of the present disclosure for such a liner 32 to be omitted and for the leaf spring 28 to be held in place by a metal-to-metal connection.

Figure 4:
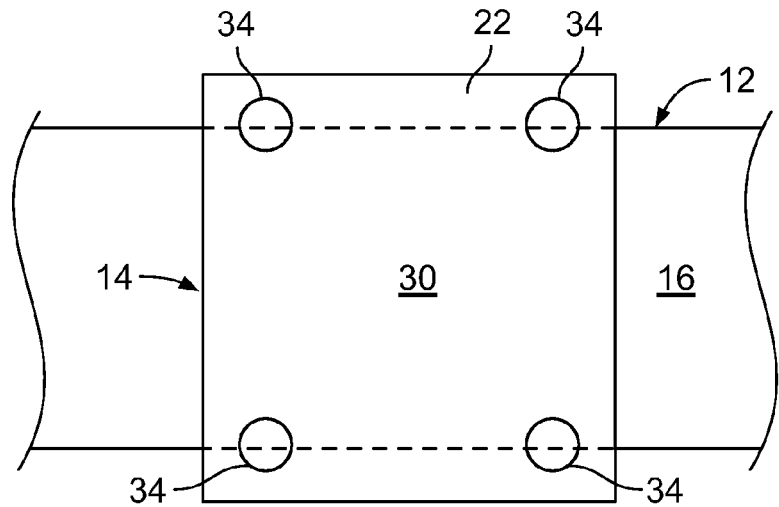
FIGS. 4-7 are top plan views of alternative configurations of a spring seat according to the present disclosure.
Figure 5:
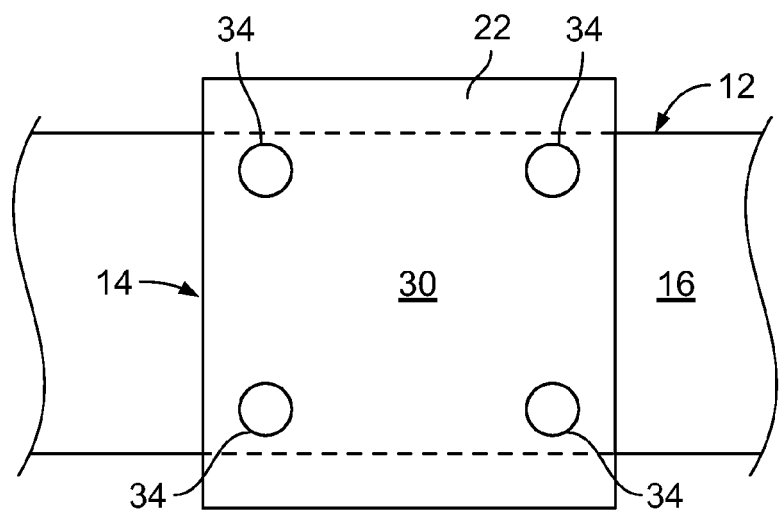
Figure 6:
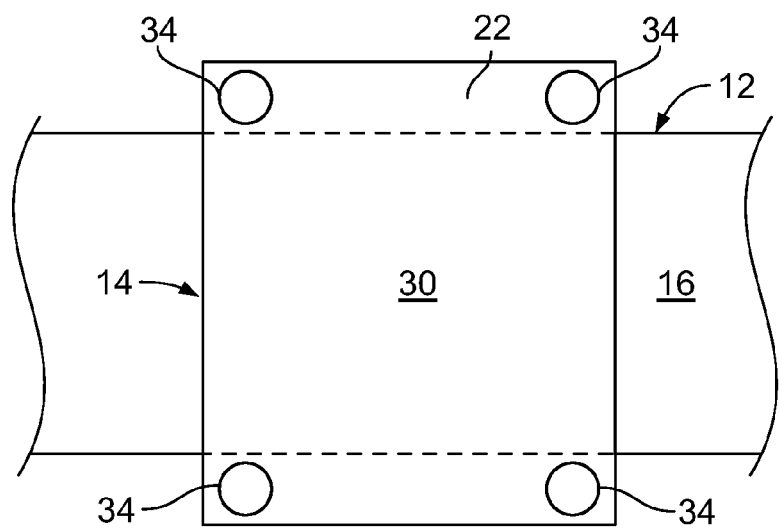

The upper surface 30 of the spring mounting portion 22 further includes a plurality of holes or bores 34 (FIG. 3). In the illustrated embodiment, the spring mounting portion 22 is provided with four bores 34, but it is within the scope of the present disclosure for more or fewer bores 34 to be defined in the upper surface 30 of the spring mounting portion 22. Depending on the number of bores 34, they may be variously arranged, with FIGS. 4-7 illustrating a variety of different arrangements that are possible for a spring mounting portion 22 having four bores 34. It should be understood that the illustrated arrangements are merely exemplary and that the bores 34 of the spring mounting portion 22 may be differently arranged without departing from the scope of the present disclosure. For example, FIGS. 4-6 illustrate arrangements in which the bores 34 are symmetrically positioned about the upper surface 30 of the spring mounting portion 22 and with respect to the axle 12 to which the spring seat 14 is connected, which may be preferred for providing a stable connection of the leaf spring 28 with respect to the axle 12. While it may be preferred for the bores 34 to be symmetrically arranged, it is also within the scope of the present disclosure for the bores 34 to be asymmetrically arranged, as in the embodiment of FIG. 7.

As shown in FIG. 1, the leaf spring 28 extends longitudinally (or transverse to the orientation of the axle 12). This provides a limit on the lateral spacing of adjacent bores 34, as a minimum separation between adjacent bores 34 in the inboard-outboard direction must be maintained in order to allow for the leaf spring 28 to be positioned between the adjacent bores 34. However, the position of the bores 34 in the longitudinal or fore-aft direction may vary without departing from the scope of the present disclosure. The fore-aft position of each bore 34 on the upper surface 30 of the spring mounting portion 22 affects the relative position of the bore 34 with respect to the axle 12, which may result in one or more bores 34 being partially positioned directly above the body 16 of the axle 12 (as in FIGS. 4 and 7), entirely directly above the body 16 of the axle 12 (as in FIGS. 5 and 7), or not directly above the body 16 of the axle 12 (as in FIGS. 6 and 7).

Stated differently, the two vertical sidewalls of the seat portion 20 of the spring seat 14 may be configured to be substantially flush with the corresponding two vertical sidewalls of the axle body 16, as shown in FIG. 2. In such an embodiment, the separation between the two vertical sidewalls of the seat portion 20 in the fore-aft direction corresponds to the width of the axle body 16 (i.e., the dimension of the axle body 16 in the fore-aft direction). When the spring seat 14 is so configured, a bore 34 may be defined in a location of the upper surface 30 of the spring mounting portion 14 that positions it ahead of the forward vertical sidewall or behind the rear vertical sidewall (according to conventional design), which provides that the bore 34 is not positioned directly above the axle body 16. Alternatively, a bore 34 may be positioned directly above one of the vertical sidewalls of the seat portion 20, which either places a portion of the bore 34 directly above the axle body 16 (as shown for all of the bores 34 in FIG. 4) or provides that the bore 34 is not positioned directly above the axle body 16 (as shown for all of the bores 34 in FIG. 6), depending on the exact location and size of the bore 34. A bore 34 may instead be defined in a location of the upper surface 30 of the spring mounting portion 14 that positions it behind the forward vertical log of the seat portion 20 and ahead of the rear vertical sidewall, which may place the entire bore 34 directly above the axle body 16, as shown for all of the bores 34 in FIG. 5.

As described above, it may be preferred for the bores 34 to be arranged symmetrically, for example with only a portion of each bore 34 being positioned directly above the axle body 16 (FIG. 4) or for the entirety of each bore 34 to be positioned directly above the axle body 16 (FIG. 5) or for none of the bores 34 to have a portion that is positioned directly above the axle body 16 (FIG. 6). The ramifications of positioning a bore 34 in these different locations with respect to the axle body 16 will be described in greater detail below.

Regardless of the exact position of the bore or bores 34, each bore 34 is configured to receive a portion of a different mechanical fastener 36 (FIG. 1), which mechanical fasteners 36 serve to connect the spring seat 14 to a top cap 38 of the clamp group of the vehicle suspension system 10. The top cap 38 may be variously configured without departing from the scope of the present disclosure, provided that it is suitable for being positioned over the clamped portion of the leaf spring 28 and secured to the spring seat 14.

In a preferred embodiment, at least one of the mechanical fasteners 36 used to connect the spring seat 14 to the top cap 38 is externally threaded (e.g., a screw) and has a portion configured to be received by an internally threaded bore 34 of the spring mounting portion 22. More preferably, each of the mechanical fasteners 36 used to connect the spring seat 14 to the top cap 38 is externally threaded and has a portion configured to be received by an internally threaded bore 34 of the spring mounting portion 22. By providing the spring seat 14 with threaded bores 34, heavyweight mechanical fasteners (e.g., U-bolts) may be replaced by lighter mechanical fasteners, thereby reducing the weight of the vehicle suspension system 10.

Figure 8:
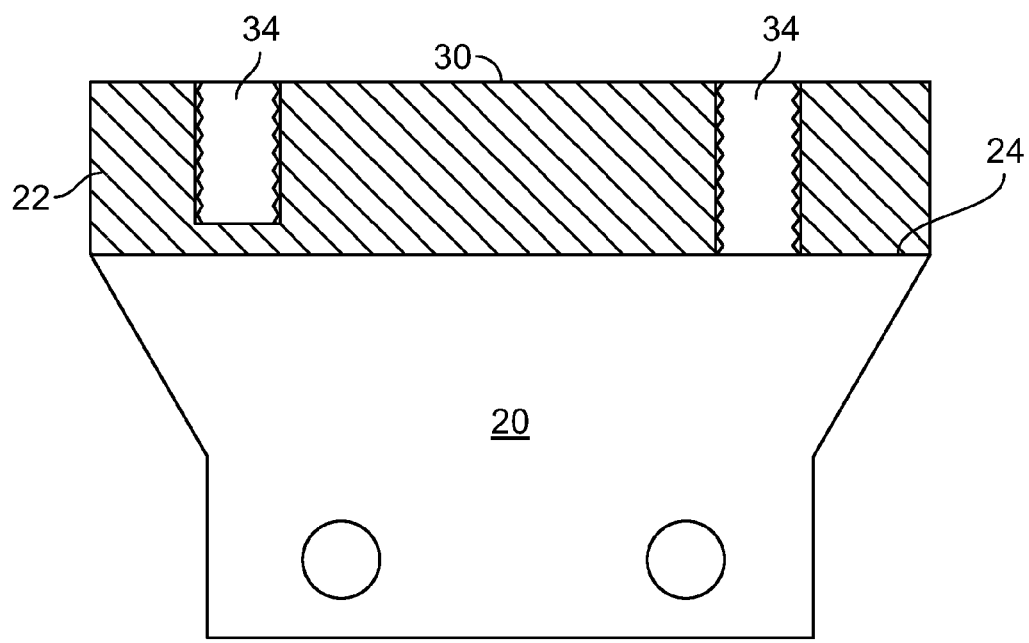
FIG. 8 is a cross-sectional view of an embodiment of a spring seat according to the present disclosure.

In addition to reducing the weight of the mechanical fasteners used in a clamp group, the use of threaded mechanical fasteners and bores may also allow for greater flexibility in the placement of the bores of a spring seat, which may allow for the size of the spring seat (and, hence, the sizes of the top cap and clamped portion of the leaf spring) to be reduced. In particular, all or a portion of a threaded bore 34 may be positioned directly above the body 16 of the axle 12 because there is no need for a portion of the associated mechanical fastener 36 (or a component used in combination with the mechanical fastener 36, such as an internally threaded nut) to be positioned beneath the spring mounting portion 22 of the spring seat 14. Indeed, a threaded bore 34 may extend only partially through the spring mounting portion 22 (i.e., have a height that is less than the distance between the upper surface 30 of the spring mounting portion 22 and the upper end 24 of the seat portion 20), as shown in the left bore 34 of FIG. 8, because the mating threads of the mechanical fastener 36 and the bore 34 are sufficient to secure the top cap 38 to the spring seat 14 without requiring a portion of the mechanical fastener 36 to extend below the lower surface of the spring mounting portion 22 to accommodate an internally threaded nut or the like. While it is sufficient for a bore 34 to extend only partially through the spring mounting portion 22, it is also within the scope of the present disclosure for a bore 34 to extend through the entire spring mounting portion 22, as shown in the right bore 34 of FIG. 8, which may reduce the weight of the spring seat 14. As in FIG. 8, one of the bores 34 may extend entirely through the spring mounting portion 22 while another bore 34 extends only partially therethrough, but it is also within the scope of the present disclosure for all of the bores 34 to extend only partially through the spring mounting portion 22 or for all of the bores 34 to extend entirely through the spring mounting portion 22. Additionally, while FIG. 8 illustrates the bores 34 as being vertically or at least substantially vertically oriented, it is within the scope of the present disclosure for one or more of the bores 34 of the spring mounting portion 22 to be oriented at an angle to vertical.

Figure 7:
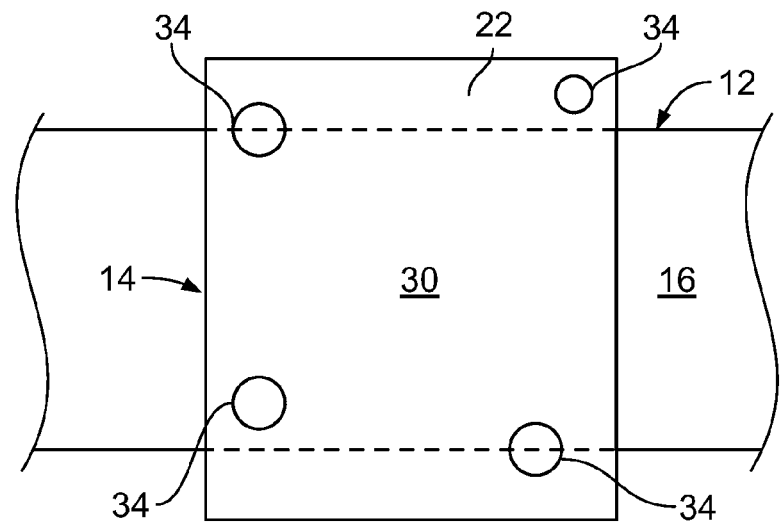

As illustrated in FIGS. 4, 5, and 7, the use of relatively short mechanical fasteners 36 allows for all or a portion of one or more bores 34 of the spring mounting portion 22 to be positioned directly above the body 16 of the axle 12. All of the spring mounting portions 22 of FIGS. 4-7 are shown as being the same size, but a spring mounting portion 22 having at least a portion of at least one bore 34 positioned directly above the axle body 16 may be smaller than a spring mounting portion 22 with no bores 34 positioned directly above the axle body 16 (as in the embodiment of FIG. 6). In particular, it is advantageous for structural purposes to provide a minimum amount of material around each bore 34 to prevent a mechanical fastener 36 from breaking through a thin section of the spring mounting portion 22. By moving adjacent bores 34 closer together in the fore-aft or longitudinal direction (i.e., by positioning at least a portion of one or both of the adjacent bores 34 directly above the axle body 16) the fore and aft edges of the spring mounting portion 16 may be closer together without risking failure of the spring mounting portion 22 along a line extending between the bore 34 and the associated fore/aft edge. It follows that reducing the spacing of the bores 34 and the size of the spring mounting portion 22 in the fore-aft direction allows for the size of the top cap 38 to also be decreased in the fore-aft direction, thereby decreasing the percentage of the leaf spring 28 occupied by the clamped portion. Decreasing the size of the clamped portion of the leaf spring 28 also decreases the spring rate of the leaf spring 28, which may be preferred to achieving the same spring rate by increasing the length of the leaf spring 28.

It should be understood that non-threaded fasteners (e.g., rivets) may also or alternatively be used to allow for at least a portion of one or more bores 34 of the spring mounting portion 22 to be positioned directly above the axle body 16, in which case the associated bores 34 need not be internally threaded. However, it may be preferred for a threaded or similarly removable mechanical fastener 36 to be employed in order to facilitate disassembly and servicing of the vehicle suspension system 10.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. An assembly for securing a portion of a leaf spring of a vehicle suspension system with respect to a body of an axle, the assembly consisting of:
   a spring seat consisting of
      a seat portion configured to be connected to a body of an axle and including an upper end, and
      a spring mounting portion associated with the upper end of the seat portion and including an upper surface defining a plurality of bores;
   a top cap; and
   a plurality of mechanical fasteners, wherein
      each bore receives at least a portion of a different one of the mechanical fasteners to connect the top cap to the spring seat with a portion of a leaf spring positioned between the top cap and the spring seat, and
      at least a portion of at least one of the bores is configured to be positioned directly above the body of the axle.

2. The assembly of claim 1, wherein said at least one of the bores is substantially vertically oriented.

3. The assembly of claim 1, wherein said at least one bores has a height that is less than the distance between the upper surface of the spring mounting portion and the upper end of the seat portion.

4. The assembly of claim 1, wherein each of the bores is internally threaded and each of the mechanical fasteners is externally threaded.

5. A vehicle suspension system, comprising:
   an axle including a body;
   a leaf spring;
   a top cap;
   a spring seat comprising
      a seat portion connected to the body of the axle and including an upper end,
      a spring mounting portion associated with the upper end of the seat portion and including an upper surface defining a plurality of bores; and
   a plurality of mechanical fasteners, wherein
      each bore receives at least a portion of a different one of the mechanical fasteners to connect the top cap to the spring seat with a portion of the leaf spring positioned between the to cap and the spring seat and seated upon the upper surface of the spring mounting portion, and
      at least a portion of at least one of the bores is positioned directly above the body of the axle.

6. The vehicle suspension system of claim 5, wherein said at least one of the bores is substantially vertically oriented.

7. The vehicle suspension system of claim 5, wherein said at least one of the bores has a height that is less than the distance between the upper surface of the spring mounting portion and the upper end of the seat portion.

8. The vehicle suspension system of claim 5, wherein each of the bores is internally threaded and each of the mechanical fasteners is externally threaded.

9. The vehicle suspension system of claim 5, wherein only a portion of at least one of the bores is positioned directly above the body of the axle.

10. The vehicle suspension system of claim 5, wherein at least one of the bores is positioned entirely directly above the body of the axle.

11. The vehicle suspension system of claim 5, wherein at least a portion of each of the bores is positioned directly above the body of the axle.

12. The vehicle suspension system of claim 11, wherein only a portion of each of the bores is positioned directly above the body of the axle.

13. The vehicle suspension system of claim 11, wherein each of the bores is positioned entirely directly above the body of the axle.

14. A vehicle suspension system, comprising:
   an axle including a body;
   a leaf spring;
   a top cap;
   a spring seat comprising
      a seat portion connected to the body of the axle and including an upper end,
      a spring mounting portion associated with the upper end of the seat portion and including an upper surface defining a plurality of bores; and
   a plurality of mechanical fasteners, wherein each bore receives at least a portion of a different one of the mechanical fasteners, the mechanical fasteners connect the top cap to the spring seat with a portion of the leaf spring positioned between the top cap and the spring seat, and at least a portion of at least one of the bores is positioned directly above the body of the axle and extends from the upper surface of the spring mounting portion to a bottom surface of the spring mounting portion.

15. The vehicle suspension system of claim 14, wherein only a portion of at least one of the bores is positioned directly above the body of the axle.

16. The vehicle suspension system of claim 14, wherein at least one of the bores is positioned entirely directly above the body of the axle.

17. The vehicle suspension system of claim 14, wherein at least a portion of each of the bores is positioned directly above the body of the axle.

18. The vehicle suspension system of claim 14, wherein only a portion of each of the bores is positioned directly above the body of the axle.

19. The vehicle suspension system of claim 14, wherein each of the bores is positioned entirely directly above the body of the axle.

20. The vehicle suspension system of claim 14, wherein said at least one of the bores is internally threaded, and at least the portion of the mechanical fastener received by said at least one bore is externally threaded.

* * * * *